United States Patent
Kitahara (10) Patent No.: US 7,092,200 B2
(45) Date of Patent: Aug. 15, 2006

(54) MAGNETIC TAPE DRIVE WITH RECORDING HEAD GROUP PROVIDING HIGH DENSITY DATA SIGNAL RECORDING

(75) Inventor: Toshiyuki Kitahara, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/876,017

(22) Filed: Jun. 25, 2004

(65) Prior Publication Data

US 2005/0286157 A1 Dec. 29, 2005

(51) Int. Cl.
*G11B 5/584* (2006.01)
(52) U.S. Cl. .................................. 360/77.12
(58) Field of Classification Search ............... None
See application file for complete search history.

(56) References Cited

U.S. PATENT DOCUMENTS

| | | | |
|---|---|---|---|
| 5,392,170 A * | 2/1995 | Solhjell | 360/63 |
| 5,689,384 A | 11/1997 | Albrecht et al. | |
| 6,275,350 B1 * | 8/2001 | Barndt | 360/77.12 |
| 6,330,123 B1 * | 12/2001 | Schwarz et al. | 360/75 |
| 6,781,784 B1 * | 8/2004 | Peterson | 360/76 |
| 2004/0141255 A1 * | 7/2004 | Ogawa et al. | 360/129 |

FOREIGN PATENT DOCUMENTS

| JP | 08-030942 A | 2/1996 |
|---|---|---|
| JP | 08-227511 A | 9/1996 |

\* cited by examiner

*Primary Examiner*—Wayne Young
*Assistant Examiner*—Daniell L. Negrón
(74) *Attorney, Agent, or Firm*—Sughrue Mion, PLLC (57) ABSTRACT

A magnetic tape drive of the present invention is the drive that has a head unit comprising a servo head for trackings and a recording head group, which comprises a plurality of data signal recording heads, wherein the plurality of the data signal recording heads are formed at a pitch corresponding to that of adjacent data tracks on a magnetic tape, and wherein a plurality of adjacent data tracks are simultaneously formed on the magnetic tape with the plurality of the data signal recording heads.

6 Claims, 7 Drawing Sheets

MAGNETIC TAPE DRIVE WITH RECORDING HEAD GROUP PROVIDING HIGH DENSITY DATA SIGNAL RECORDING

BACKGROUND OF THE INVENTION

1. Field of the Invention

The present invention relates to a magnetic tape drive, and in particular, to the magnetic tape drive that can form data tracks in a lateral direction in a higher density, compared to a conventional magnetic tape drive.

2. Description of the Related Art

These years in a magnetic tape used for a data backup of a computer and the like, an augmentation of a memory capacity progresses and some magnetic tapes have a capacity of not less than 100 GB (gigabyte). When in such the magnetic tapes data tracks are formed along longitudinal directions (travel directions) thereof, a width of each data track itself and a distance between each data track are narrowed and a number of data tracks are increased, thereby a high density of the data tracks being intended.

In order to record/reproduce data signals on such the magnetic tapes, a conventional magnetic tape drive is equipped with a head unit having a plurality of data signal recording heads and data signal reproducing heads, respectively. Since in the head unit a data signal recording head or a data signal reproducing head is in charge of recording/reproducing of adjacent data tracks on a magnetic tape, the data signals are recorded/reproduced with moving the data signal recording head or the data signal reproducing head onto a adjacent data track by moving all of the head unit in a lateral direction of the magnetic tape by a minute amount while reciprocating the magnetic tape for the head unit a plurality of times. Therefore, in the conventional magnetic tape drive is introduced a tracking servo technology for controlling a position of the head unit in the lateral direction of the magnetic tape.

The tracking servo technology is a technology where servo signals written on a magnetic tape in advance are read with a servo write head provided at a head unit, a position of the head unit in a lateral direction of the magnetic tape is controlled by driving an actuator in response to the read servo signals, and the data signal recording head or the data signal reproducing head is made to follow a data track. As this kind of a tracking servo technology, for example, in Japanese Patent Laid-Open Publication Hei 8-227511 is disclosed a technology of an amplitude servo system where a plurality of bursts are aligned as servo signals in two lines in longitudinal directions of a magnetic tape. In addition, in Japanese Patent Laid-Open Publication Hei 8-30942 is disclosed a technology of a timing based servo system where timing based signals of a predetermined pattern are recorded as servo signals on a servo track.

In the meantime, the conventional magnetic tape drive forms one piece of data track with one data signal recording head, and then, moves a position of the data signal recording head to a prearranged position where a next data track, which is adjacent to the data track formed now, is formed. Therefore, there are some cases where a predetermined width of margin is provided between adjacent data tracks on a magnetic tape so that a newly formed data track does not overlap a precedingly formed data track due to a control amount error in moving the head unit in the lateral direction of the magnetic tape. And the conventional magnetic tape drive intends to narrow the width of the margin in order to form data tracks in a higher density in the lateral direction of the magnetic tape by heightening an accuracy of a tracking servo.

However, since there exists a limitation in heightening the accuracy of the tracking servo, there is a problem that the conventional magnetic tape drive cannot form the data tracks in the higher density in the lateral direction of the magnetic tape.

Consequently, is strongly requested a magnetic tape drive that can form the data tracks in the higher density in the lateral direction of the magnetic tape, compared to the conventional magnetic tape drive.

SUMMARY OF THE INVENTION

A first aspect of a magnetic tape drive of the present invention is the drive that has a head unit comprising a servo head for trackings and a recording head group, which comprises a plurality of data signal recording heads, wherein the plurality of the data signal recording heads are formed at a pitch corresponding to that of adjacent data tracks on a magnetic tape, and wherein a plurality of adjacent data tracks are simultaneously formed on the magnetic tape with the plurality of the data signal recording heads.

In accordance with the recording head group comprising the plurality of the data signal recording heads thus configured, the plurality of the adjacent data tracks (data track group) can be simultaneously formed on the magnetic tape. That is, the data tracks are formed on the magnetic tape at a width and distance of the data tracks same as the data signal recording heads are formed on the head unit. Therefore, different from the conventional magnetic tape drive, it becomes unnecessary to provide a margin matching with a control amount error between the adjacent data tracks on the magnetic tape in moving the head unit in a lateral direction of the magnetic tape. Accordingly, in accordance with the magnetic tape drive comprising the recording head group, the data tracks can be formed in a higher density in the lateral direction of the magnetic tape, compared to the conventional magnetic tape drive. Meanwhile, since a pitch accuracy of adjacent data signal recording heads on the head unit depends on a processing accuracy in forming head gaps of the data signal recording heads on the head unit, the margin described above can be neared to zero as much as possible if the margin is within a range of the processing accuracy.

A second aspect of a magnetic tape drive of the present invention in the first aspect thereof is the drive; wherein the head unit is configured of a plurality of data signal reproducing heads and comprises a reproducing head group arranged in parallel with the recording head group, wherein each width of the data signal reproducing heads is set narrower than that of the data signal recording heads; wherein positions at both sides of the reproducing head group are set outside both sides of the recording head group in a lateral direction of a magnetic tape so as to include a control amount error in moving the head unit in the lateral direction of the magnetic tape; whereby a plurality of adjacent data tracks are simultaneously reproduced with the plurality of the data signal reproducing heads.

In accordance with the reproducing head group that is thus configured of the plurality of the data signal reproducing heads and is arranged in parallel with the recording head group with being ranged in the travel direction of the magnetic tape, each data track of a data track group, which is formed on the magnetic tape by the recording head group, can be simultaneously reproduced. In addition, since each width of the data signal reproducing heads is set narrower than that of the data signal recording heads, and the positions at both sides of the reproducing head group are set outside both sides of the recording head group in the lateral direction of the magnetic tape so as to include the control amount error in moving the head unit in the lateral direction of the magnetic tape, each data track of the data track group can certainly be traced with any of the data signal reproducing heads of the reproducing head group, even when in reproducing there is the control amount error in moving the head unit in the lateral direction of the magnetic tape. Accordingly, data signals recorded on each data track of the data track group can surely be reproduced. Meanwhile, although there is a case where one piece of data track is reproduced with the plurality of the data signal reproducing heads, in this case nothing but the data signals, which are correctly reproduced from the data track, is designed to be selected.

Meanwhile, since each pitch of the data signal reproducing heads is narrower than that of the data track, it is to know which data signal reproducing head completely traces a data track surface to simultaneously reproduce adjacent data tracks. In other words, it is known which data signal reproducing head rides on which data track, only after comparing each signal detected with the plurality of the data signal reproducing heads. Accordingly, "to simultaneously reproduce" means not that a content of the adjacent data tracks must certainly be simultaneously read but that the content of the adjacent data tracks suffices to be detected with the plurality of the data signal reproducing heads: According to the detection, identifying a data signal reproducing head on track, detection values on a needed data track may be read as data.

A third aspect of a magnetic tape drive of the present invention in the second aspect of the magnetic tape drive is the drive, wherein a number of data signal reproducing heads comprised in the reproducing head group is set more than a number, Nw×(Pw/Pr)+1, where Nw, the number of the data signal recording heads comprised in the recording head group; Pw, a pitch of adjacent data signal recording heads within the recording head group; and Pr, a pitch of adjacent data signal reproducing heads within the reproducing head group.

Thus setting the number of the data signal reproducing heads comprised in the reproducing head group more than the number, Nw×(Pw/Pr)+1, positions of data signal reproducing heads arranged at both sides of the reproducing head group become outside data signal recording heads arranged at both sides of the recording head group. Therefore, even when in reproducing there is a control amount error in moving the head unit in the lateral direction of the magnetic tape, data tracks formed with the data signal recording heads arranged at both sides of the recording head group can certainly be traced with the data signal reproducing heads, which are arranged at both sides of the reproducing head group, and any of data signal reproducing heads at inside of the described above ones.

A fourth aspect of a magnetic tape drive of the present invention in the second aspect of the magnetic tape drive is the drive, wherein a head width of the data signal reproducing heads is set not less than Pw×0.2, where Pw is a pitch of adjacent data signal recording heads within the recording head group.

Thus setting the head width of the data signal reproducing heads not less than Pw×0.2, they can sufficiently obtain a needed output, thereby data tracks being able to be surely reproduced.

A fifth aspect of a magnetic tape drive of the present invention in the second aspect of the magnetic tape drive is the drive, wherein the head width of the data signal recording heads is set not less than 2Wr+Dr, where Wr, a head width of adjacent data signal reproducing heads within the reproducing head group; and Dr, a distance between the adjacent data signal reproducing heads.

Thus setting the head width of the data signal reproducing heads not less than 2Wr+Dr, one data signal reproducing head certainly rides on a data track even when two adjacent data signal reproducing heads are separated on each side of the data track, thereby the data track being able to be surely reproduced.

BRIEF DESCRIPTION OF THE DRAWINGS

In FIGS. 1A and 1B.

In FIGS. 3A and 3B.

FIGS. 6A to 6C are partial plan views of the magnetic tape MT and the head unit HU for illustrating operation of the head unit HU in recording/reproducing.

DESCRIPTION OF THE PREFERRED EMBODIMENTS

Here will be described one embodiment of a magnetic tape drive related to the present invention in detail, referring to drawings as needed.

First, a magnetic tape reproduced by the magnetic tape drive of the present invention will be described, referring to FIGS. 1A and 1B.

Figure 1A:
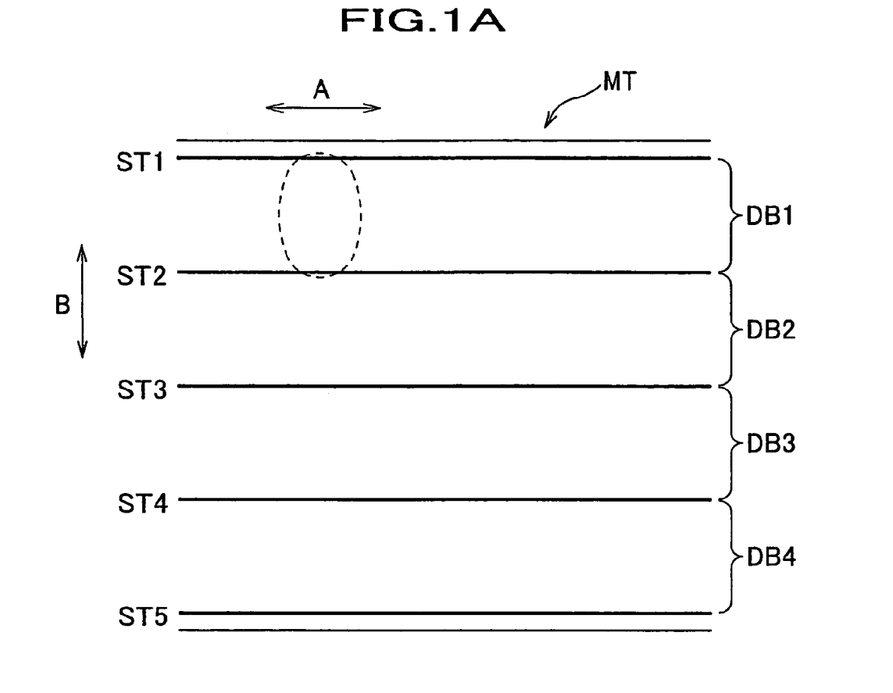
FIG. 1A is a partial plan view of a magnetic tape MT.

A magnetic tape MT shown in FIG. 1A is a magnetic tape for a data backup having a width of a half inch, for example, according to the LTO (Linear Tape Open) standard. In longitudinal directions (travel directions) A of the magnetic tape MT five pieces of servo tracks ST1 to ST5 are written. Each of the servo tracks ST1 to ST5 is formed at an equal distance in lateral directions B of the magnetic tape MT. Meanwhile, the servo tracks ST1 to ST5 are written by a servo writer not shown.

And a region between each two adjacent tracks of the servo tracks ST1 to ST5 becomes a band (data band) where data signals are recorded by a magnetic tape drive 10. Since on the magnetic tape MT shown in FIG. 1A the five pieces of the servo tracks ST1 to ST5 are formed, four pieces of data bands DB1 to DB4 are formed on the magnetic tape MT. On the data bands DB1 to DB4, as shown in FIG. 1B, a plurality of data tracks DT are formed at a constant pitch in parallel with the servo tracks ST1 and ST2.

Next, a configuration of the magnetic tape drive 10 related to the embodiment will be described, referring to FIG. 2.

Figure 2:
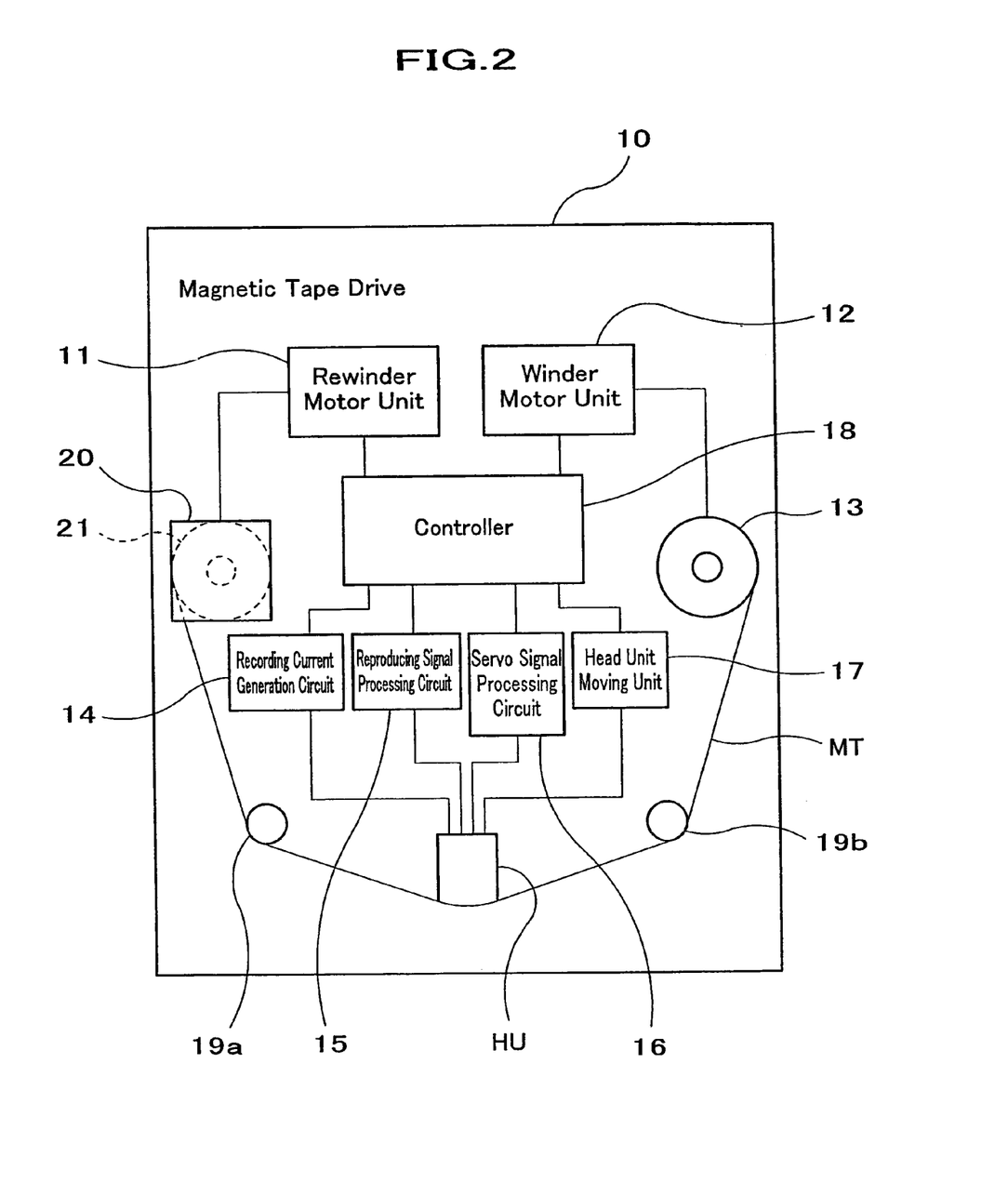
FIG. 2 is a schematic configuration of a magnetic tape drive 10 related to an embodiment of the present invention.

The magnetic tape drive 10 shown in FIG. 2, which is connected to a computer not shown, is an apparatus that records data input from the computer as data signals on the magnetic tape MT of a magnetic tape cartridge 20 in response to an instruction from the computer, and reproduces data signals recorded in the magnetic tape MT.

As shown in FIG. 2, the magnetic tape drive 10 mainly comprises a rewinder motor unit 11, a winder motor unit 12, a winder 13, a head unit HU, a recording current generation circuit 14, a reproducing signal processing circuit 15, a servo signal processing circuit 16, a head unit moving unit 17, and a controller 18.

In addition, although not shown in FIG. 2, the magnetic tape drive 10 comprises an insertion/removal unit for inserting/removing the magnetic tape cartridge 20, a pull-out unit for pulling out the magnetic tape MT from the magnetic tape cartridge 20, and the like. And when the magnetic tape cartridge 20 is inserted within the magnetic tape drive 10, the magnetic tape drive 10 is designed so that the pull-out unit pulls out a top end of the magnetic tape MT and attaches it to a hub of the winder 13. Here will be described each unit of the magnetic tape drive 10.

The rewinder motor unit 11 is a unit for rotationally driving a rewinder 21 of the magnetic tape cartridge 20. In addition, the winder motor unit 12 is a unit for rotationally driving the winder 13. And when recording data signals on the magnetic tape MT (hereinafter referred to as "in recording") and reproducing the data signals recorded on the magnetic tape MT (hereinafter referred to as "in reproducing"), the magnetic tape MT runs by the rewinder motor unit 11 and the winder motor unit 13 rotationally driving the rewinder 21 and the winder 13. Here, a case where the magnetic tape MT is pulled out from the rewinder 21 is assumed to be an "outward way"; another case where the magnetic tape MT is rewound is assumed to be a "return way." Meanwhile, the magnetic tape MT runs with being guided by guides 19a and 19b.

The head unit HU is a unit for recording the data signals and reproducing those recorded on the magnetic tape MT.

Figure 3A:
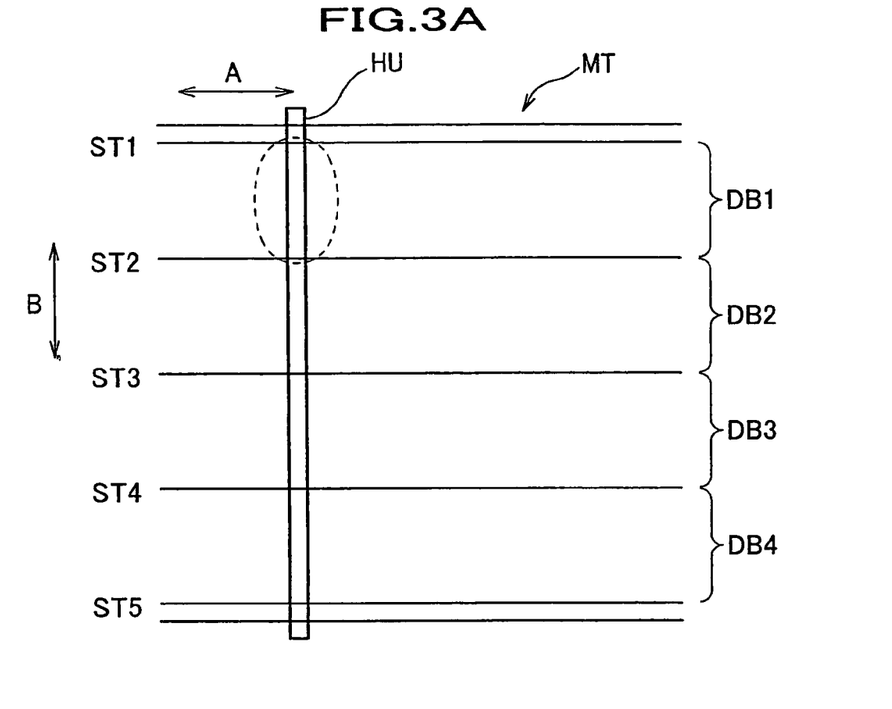
FIG. 3A is a plan view showing a head unit HU.
Figure 3B:
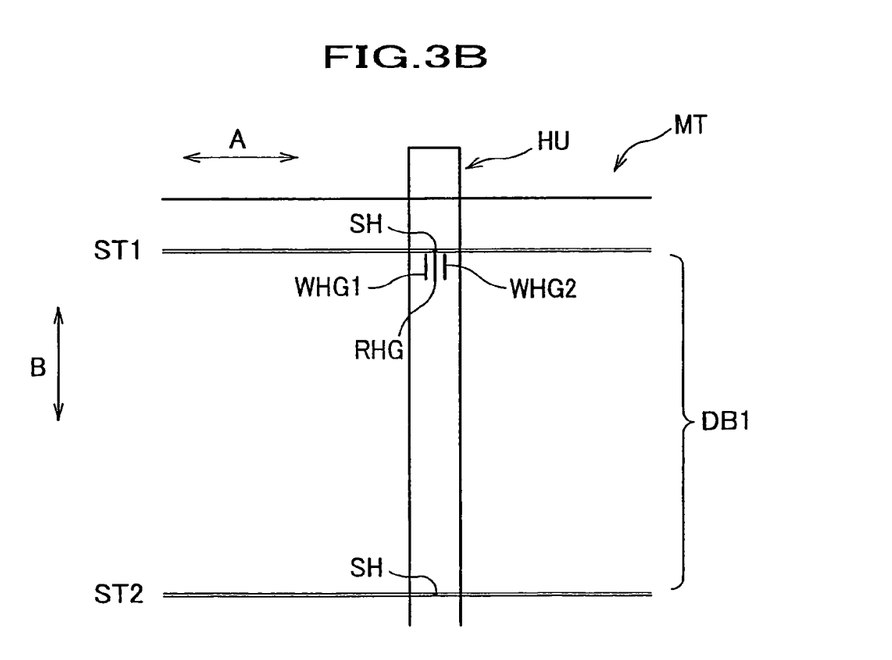
FIG. 3B is a partial enlarged plan view of the head unit HU where an enclosed part of FIG. 3A by broken lines is shown in an enlargement.
Figure 4:
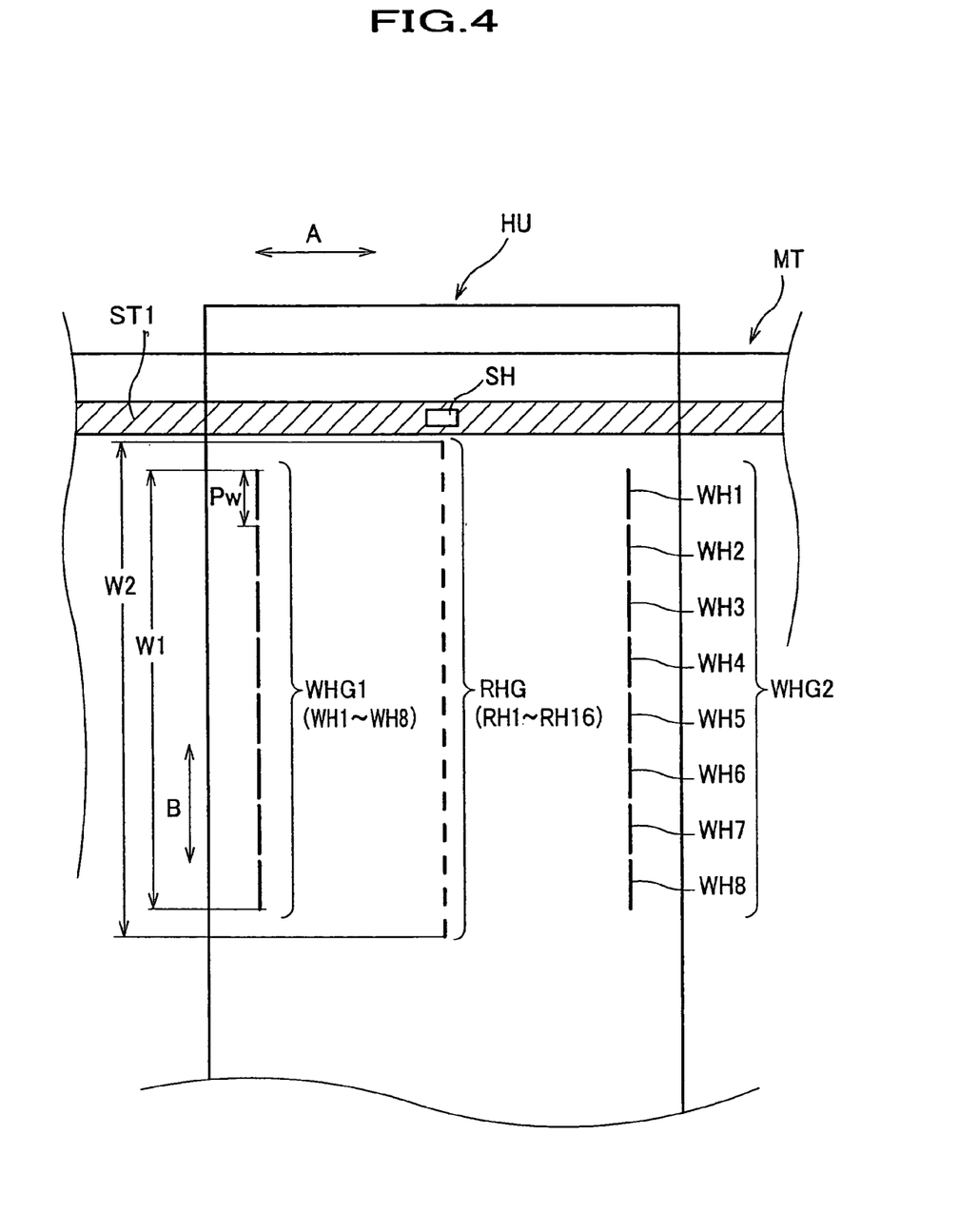
FIG. 4 is a partial enlarged plan view of the head unit HU where a vicinity of each head is shown in a more enlargement.

As shown in FIG. 3A, the head unit HU has a width wider than that of the magnetic tape MT and is arranged so as to contact all width of the magnetic tape MT. And in recording/reproducing the head unit HU is moved in the lateral directions B of the magnetic tape MT by the head unit moving unit 17. Then as shown in FIGS. 3B and 4, the head unit HU has on a contact surface thereof a plurality of data signal recording heads WH1 to WH8 for recording data signals on the magnetic tape MT and a plurality of data signal reproducing heads RH1 to RH6. In addition, the head unit HU has a plurality of servo read heads SH for reading servo signals from the servo tracks ST1 to ST5 formed on the magnetic tape MT.

The plurality of the data signal recording heads WH1 to WH8 are, as shown in FIG. 4, arranged in a line in the lateral directions B of the magnetic tape MT as a "recording head group WHG." In the embodiment the recording head group WHG is configured of eight data signal recording heads WH1 to WH8. In accordance with the recording head group WHG, in recording, eight pieces of adjacent data tracks DT can be simultaneously formed on each of the data bands DB1 to DB4. Here, each eight pieces of data tracks DT formed simultaneously is decided to be called a "data track group DTG." (See FIG. 7.)

In addition, the pitch Pw of adjacent heads of the data signal recording heads WH1 to WH8 is set same as that of adjacent data tracks DT that are prearranged to be formed on the magnetic tape MT. Accordingly, in accordance with the recording head group WHG, since in recording, different from the conventional magnetic tape drive, it becomes unnecessary to provide a margin matching with a control amount error between the adjacent data tracks DT on the magnetic tape MT in moving the head unit HU in the lateral directions B of the magnetic tape MT, the data tracks DT can be formed in a higher density in the lateral directions B of the magnetic tape MT, compared to the conventional magnetic tape drive. Meanwhile, since an accuracy of the pitch Pw depends on a processing accuracy in forming head gaps of the data signal recording heads WH1 to WH8 on the head unit HU, a size of the pitch Pw can be neared to a width of the data tracks DT, that is, a width of the data signal recording heads WH1 to WH8 as much as possible if the size of the pitch Pw is within a range of the processing accuracy.

The plurality of the data signal reproducing heads RH1 to RH6 are, as shown in FIG. 4, arranged in a line in the lateral directions B of the magnetic tape MT as a "reproducing head group RHG." The reproducing head group RHG is arranged in parallel with the recording head group WHG. In the embodiment the recording head group WHG is configured of 16 data signal reproducing heads RH1 to RH16. In accordance with the reproducing head group RHG each data track DT of the data track group DTG, which is formed on the magnetic tape MT by the recording head group WHG, can be simultaneously reproduced.

And each width of the data signal reproducing heads RH1 to RH16 of the reproducing head group RHG is set narrower than that of the data signal recording heads WH1 to WH8. In addition, a total width W2 of the reproducing head group RHG is set wider than a total width W1 of the recording head group WHG, and positions at both sides of the reproducing head group RHG are set outside both sides of the recording head group WHG in the lateral directions B of the magnetic tape MT so as to include a control amount error in moving the head unit HU in the lateral directions B of the magnetic tape MT. Accordingly, in accordance with the reproducing head group RHG, even when in reproducing there is the control amount error in moving the head unit HU in the lateral directions B of the magnetic tape MT, each data track DT of the data track group DTG can certainly be traced with any of the data signal reproducing heads RH1 to RH16 of the reproducing head group RHG. Accordingly, data signals recorded on each data track DT of the data track group DTG can surely be reproduced. Meanwhile, although there is a case where one piece of data track DT is reproduced with a plurality of the data signal reproducing heads RH1 to RH16, in this case nothing but the data signals, which are correctly reproduced from the data track DT, is designed to be selected.

Next, referring to FIG. 5, will be described an example of reproducing the data track group DTG which the recording head group WHG forms with the reproducing head group RHG.

Figure 5:
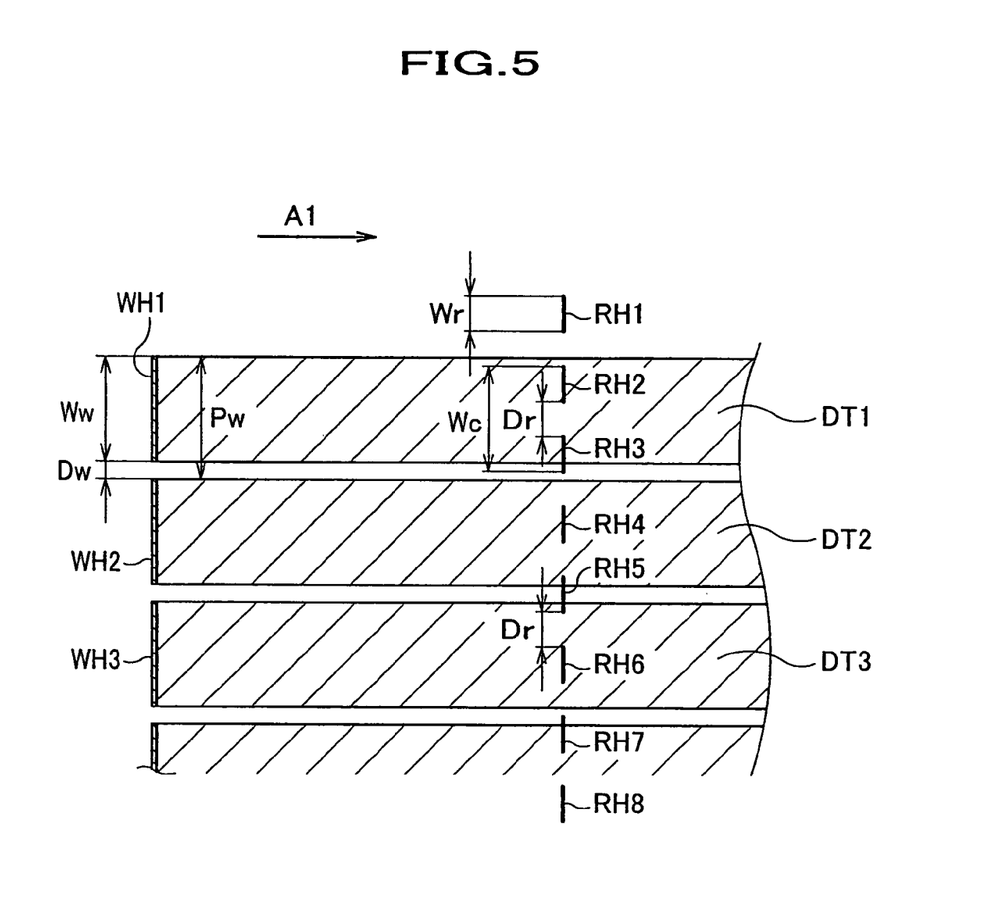
FIG. 5 is an illustration drawing for showing a state where data tracks DT1 to DT3 formed by data signal recording heads WH1 to WH3 of a recording head group WHG are traced with data signal reproducing heads RH2 to RH6 of a reproducing head group RHG.

As shown in FIG. 5, a position of the data signal reproducing head RH1, which is arranged at one side of the reproducing head group RHG, is set so as to be outside the data signal recording head WH1 arranged at one side of the recording head group WHG. Accordingly, even when in reproducing there is a control amount error in moving the head unit HU in the lateral directions B of the magnetic tape MT, the data track DT1, which is formed with the data signal recording head WH1 arranged at the one side of the recording head group WHG, can certainly be traced with the data signal reproducing head RH1 of the reproducing head group RHG and any of the inside (inside in the lateral directions B of the magnetic tape MT) data signal reproducing heads RH2 to RH16.

In addition, here, each head width Ww of the data signal recording heads WH1 to WH8 is set 3 μm; each head width Wr of the data signal reproducing heads RH1 to RH16, 1 μm; each distance Dw of the data signal recording heads WH1 to WH8, 0.5 μm; and each distance Dr of the data signal reproducing heads RH1 to RH16, 1 μm. Accordingly, since although each track width of the data tracks DT1 to DT3, which is formed with each of the data signal recording heads WH1 to WH3, becomes 3 μm, each head width Wr of the data signal reproducing heads RH1 to RH16 is set 1 μm, and each distance Dr of the data signal reproducing heads RH1 to RH16 is set 1 μm, each data track DT of the data track group DTG can certainly be traced with any of the data signal reproducing heads RH1 to RH 16 of the reproducing head group RHG even when in reproducing there is the control amount error in moving the head unit HU in the lateral directions B of the magnetic tape MT.

In other words, the data signal reproducing heads RH1 to RH16 tend to be off data tracks DT at maximum in a case where any two adjacent heads of the data signal reproducing heads RH1 to RH16 are positioned with being separated on each side of any data track DT, that is, positioned on both sides of the data track DT. For example, positions of the data signal reproducing heads RH2 and RH3 in FIG. 5 are the case. If although in FIG. 5 the RH2 completely rides on the data track DT1, the distance Dr between the RH2 and the RH3 is a little bit wider, the RH2 results in being partly off the data track DT1. Thus even when any two adjacent heads of the data signal reproducing heads RH1 to RH16 are positioned with being separated on each side of any data track DT, a distance Wc between both outsides of the two adjacent data signal reproducing heads may be narrower than the width of the data track DT in order that one of the data signal reproducing heads RH1 to RH16 certainly rides on the data track DT. That is, the data signal reproducing heads RH1 to RH16 may be formed so that the following equation is satisfied:

$$Ww \geq 2Wr + Dr(=Wc).$$

Meanwhile, in FIG. 5 the data tracks DT1, DT2, and DT3 are traced by the data signal reproducing heads RH2 and RH3, the data signal reproducing heads RH4 and RH5, and the data signal reproducing heads RH6, respectively.

Continuing descriptions with returning to FIGS. 3B and 4, recording head groups WHG and the reproducing head group RHG are arranged, in order of the recording head group WHG, the reproducing head group RHG, and the recording head group WHG, in the longitudinal directions A of the magnetic tape MT. And in a case that a travel direction of the magnetic tape MT is the outward way, data signals are designed to be recorded with one recording head group WHG1; in a case of the return way the data signals are designed to be recorded with the other recording head group WHG2.

Here, it is in order to reproduce recorded data signals for an inspection, in the outward way and return way of the magnetic tape MT, just after any of the recording head group WHG1 and the recording head group WHG2 records data signals on the magnetic tape MT that the reproducing head group RHG is arranged between the recording head group WHG1 and the recording head group WHG2. Meanwhile, the recording head groups WHG and the reproducing head group RHG can also be arranged in three lines in order of the reproducing head group RHG, the recording head groups WHG, and the reproducing head group RHG.

Figure 1B:
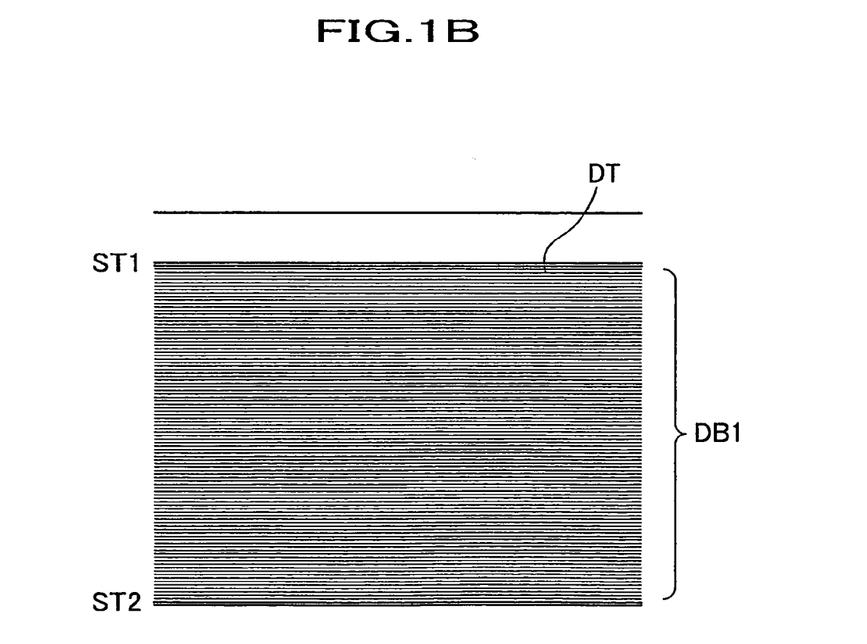
FIG. 1B is a partial enlarged plan view of the magnetic tape MT where an enclosed part of FIG. 1A by broken lines is shown in an enlargement.

Since in the embodiment it is assumed that data signals are recorded on the data bands DB1 to DB4 of the magnetic tape MT shown in FIGS. 1A and 1B and the data signals are reproduced from each data track DT formed on the data bands DB1 to DB4, the recording head groups WHG and the reproducing head group RHG are provided at positions corresponding to the data bands DB1 to DB4 in the head unit HU, respectively. That is, the head unit HU has eight recording head groups WHG and four reproducing head groups RHG, and for every positions corresponding to the data bands DB1 to DB4 in the head unit HU, two recording head groups WHG and one reproducing head group RHG are provided.

The recording current generation circuit 14 is a circuit for supplying a recording current, in recording, to each of the data signal recording heads WH1 to WH8 of the head unit HU. The recording current generation circuit 14 generates the recording current in recording, based on recording current control signals input from the controller 18, and supplies the recording current to each of the data signal recording heads WH1 to WH8 of the head unit HU.

The reproducing signal processing circuit 15 is a circuit for converting, in reproducing, data signals reproduced with each of the data signal reproducing heads RH1 to RH16 to signals (reproducing signals) which the controller 18 can handle. The reproducing signals are output to the controller 18.

The servo signal processing circuit 16 is a circuit for converting, in recording/reproducing, servo signals read with the servo read heads SH of the head unit HU to signals (read signals) which the controller 18 can handle. The read signals are output to the controller 18.

The head unit moving unit 17 is a unit for moving, in recording/reproducing, the head unit HU in the lateral directions B of the magnetic tape MT. In recording/reproducing the head unit moving unit 17 moves the head unit HU in the lateral directions B of the magnetic tape MT, based on head unit control signals input from the controller 18, and adjusts positions (positions in the lateral directions B of the magnetic tape MT) of the recording head groups WHG and the reproducing head group RHG on the data bands DB1 to DB4.

The controller 18 is a controller for controlling operation of each unit of the magnetic tape dive 10. In recording the controller 18 produces recording current control signals, based on data input from a computer not shown, and outputs the recording current control signals to the recording current generation circuit 14. In addition, in reproducing the controller 18 converts reproducing signals, which are input from the reproducing signal processing circuit 15, to a data format output to the computer, and outputs the conversion data to it.

Furthermore, in recording/reproducing the controller 18 detects displacements of the recording head groups WHG and the reproducing head group RHG of the head unit HU for the lateral directions B of the magnetic tape MT, based on the read signals input from the servo signal processing circuit 16, produces the head unit control signals with considering position movement amounts for correcting the displacements of the recording head groups WHG and the reproducing head group RHG of the head unit HU for the lateral directions B of the magnetic tape MT, and outputs the head unit control signals to the head unit moving unit 17.

Next, will be described operation in recording/reproducing of the head unit HU comprised in the magnetic tape drive 10, referring to FIGS. 6A to 6C and 7.

First, a case in recording will be described. In recording, while first running the magnetic tape MT in an outward way direction A1 by the rewinder motor unit 11 and the winder motor unit 12, form a data track group DTG1 (see FIG. 6A) on the data band DB1 with the recording head group WHG1 of the head unit HU. At this time the recording head group WHG1 simultaneously forms eight pieces of data tracks DT.

Figure 6A:
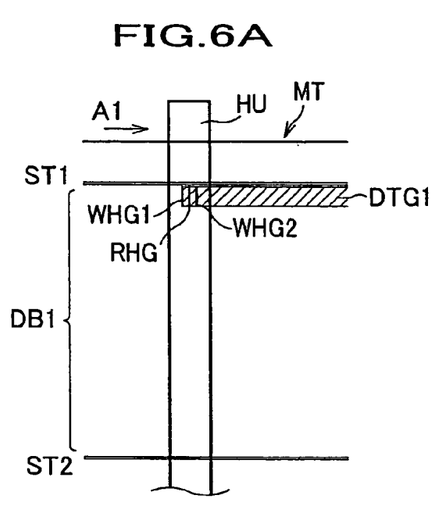
FIG. 6A shows a case where a data track group DTG1 is recorded/reproduced.
Figure 6B:
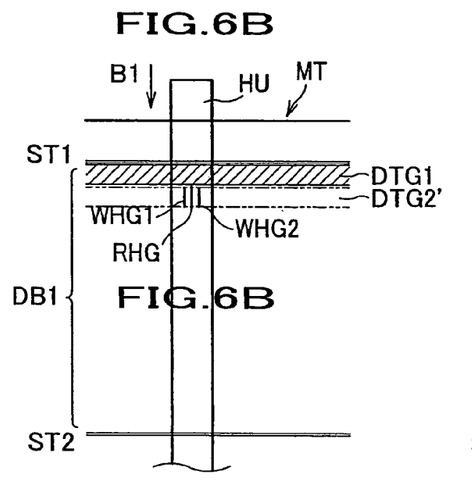
FIG. 6B shows another case after the data track group DTG1 is recorded/reproduced.

Next, after the recording head group WHG1 forms the data track group DTG1, move the head unit HU in a lateral direction B1 of the magnetic tape MT by the head unit moving unit 17, and then, move a position (position in the lateral directions B of the magnetic tape MT) of the recording head group WHG2 on the data band DB1 to a position DTG2', which is adjacent to the recording head group WHG1 now formed, where a data track group DTG2 is prearranged to be next formed (see FIG. 6B).

Figure 7:
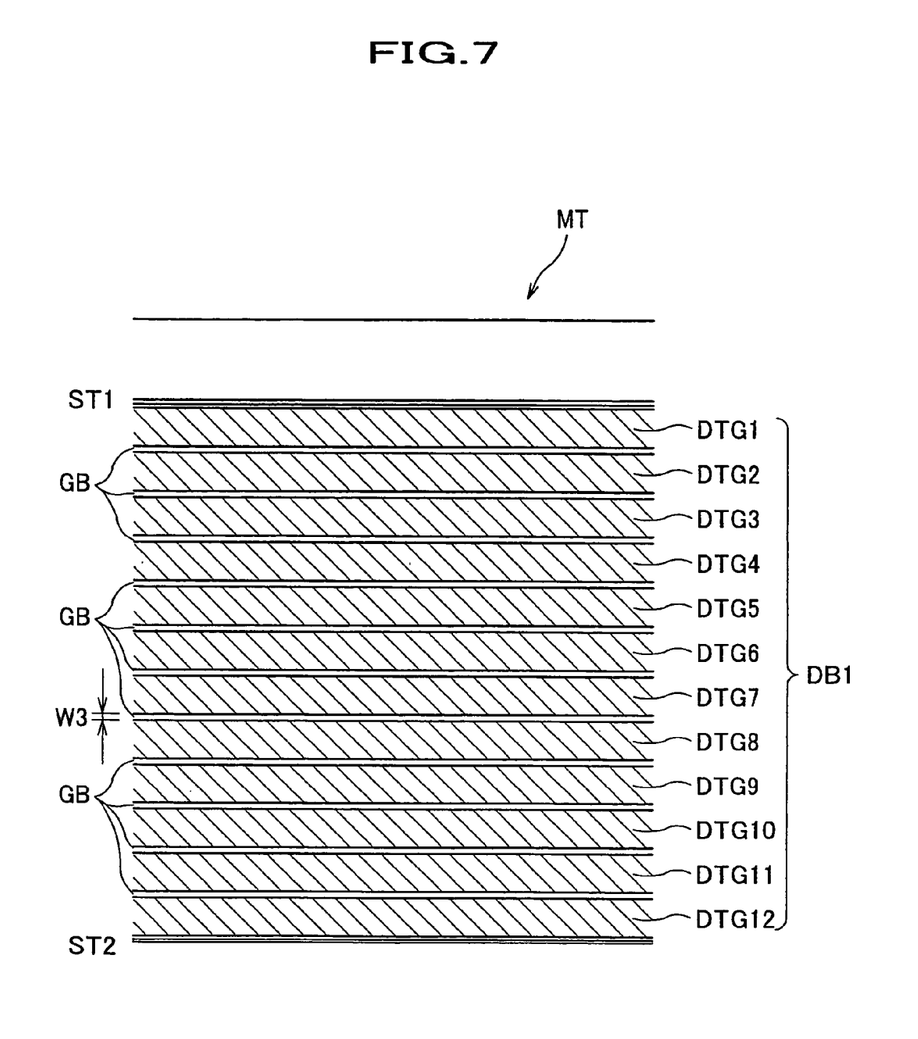
FIG. 7 is a partial plan view of the magnetic tape MT showing data track groups DTG1 to DTG 12 that are formed on a data band DB1 with the head unit HU.

In addition, in moving the head unit HU a movement amount thereof is set so that "guard bands GB" with a predetermined width W3 are formed between the data track group DTG1 and the data track group DTG2 (see FIG. 7). The width W3 of the guard bands GB is set a width matching with a control amount error in moving the head unit HU in the lateral directions B of the magnetic tape MT. That is, the guard bands GB become margins for the control amount error in the lateral directions B of the head unit HU.

Figure 6C:
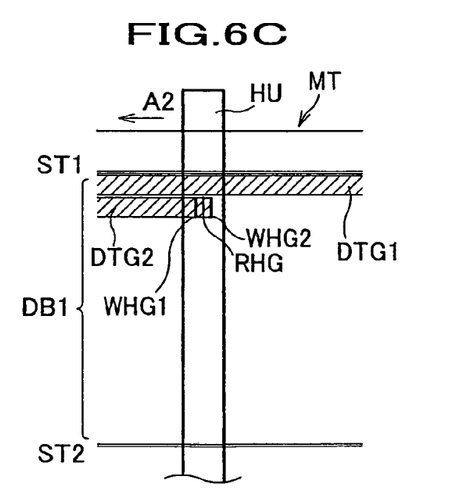
FIG. 6C shows still another case where a data track group DTG2 is recorded/reproduced.

And while running the magnetic tape MT in an return way direction A2 by the rewinder motor unit 11 and the winder motor unit 12, form the data track group DTG2 on the data band DB1 with the recording head group WHG2 (see FIG. 6C).

Repeating the operation thus described, many data tracks DT can be formed on the data band DB1. For example, when forming 96 pieces of data tracks on the data band DB1, twelve data track groups DTG1 to DTG12, each of which consists of eight pieces of data tracks DT, respectively, can be formed with the recording head group WHG1 and the recording head group WHG2 by moving the head unit HU in the lateral directions B of the magnetic tape MT in each running while running the magnetic tape MT every six times in the outward way direction A1 and the return way direction A2 (see FIG. 7). Meanwhile, cases of forming the data tracks DT on other data bands DB2 to DB4 are also same.

Next, a case in reproducing will be described. Meanwhile, here is assumed the case where the data track groups DTG1 to DTG12, which are formed with the recording head groups WHG, are reproduced.

In reproducing, while first running the magnetic tape MT in the outward way direction A1 by the rewinder motor unit 11 and the winder motor unit 12, reproduce each data track DT included in the data track group DTG1 formed on the data band DB1 with the reproducing head group RHG of the head unit HU (see FIG. 6A). Since at this time each data track DT of the data track groups DTG1 to DTG12 can certainly be traced with any of the data signal reproducing heads RH1 to RH16 of the reproducing head group RHG, data signals recorded on each data track DT of the data track groups DTG1 to DTG12 can surely be reproduced.

Next, after forming the data track group DTG1 with the reproducing head group RHG, move the head unit HU in the lateral direction B1 of the magnetic tape MT by the head unit moving unit 17, and then, move a position (position in the lateral directions B of the magnetic tape MT) of the reproducing head group RHG on the data band DB1 to the position of the data track group DTG2' formed adjacent to the data track group DTG1 (see FIG. 6B).

And while running the magnetic tape MT in the return way direction A2 by the rewinder motor unit 11 and the winder motor unit 12, reproduce each data track included in the data track group DTG2 with the reproducing head group RHG (see FIG. 6C).

Repeating the operation thus described, each data track DT, which is included in each of the data track groups DTG1 to DTG12 formed on the data band DB1, can surely be reproduced. Meanwhile, twelve data track groups DTG1 to DTG12 can be reproduced with the reproducing head group RHG by moving the head unit HU in the lateral directions B of the magnetic tape MT in each running while running the magnetic tape MT every six times in the outward way direction A1 and the return way direction A2 (see FIG. 7). Meanwhile, cases of reproducing the data track groups DTG1 to DTG12 formed on other data bands DB2 to DB4 are also same.

Thus, although one of the embodiments of the present invention is described, the invention is not limited to such the embodiment and various variations are available without departing from the spirit and scope of the invention.

What is claimed is:

1. A magnetic tape drive comprising:
   a head unit;
   a servo head for trackings; and
   a recording head group comprising a plurality of data signal recording heads,
   wherein said plurality of the data signal recording heads are formed at a pitch corresponding to a pitch of adjacent data tracks on a magnetic tape,
   wherein a plurality of the adjacent data tacks are simultaneously formed on the magnetic tape with said plurality of the data signal recording heads,
   wherein said head unit is configured of a plurality of data signal reproducing heads and comprises a reproducing head group arranged in parallel with said recording head group,
   wherein each width of said data signal reproducing heads is set narrower than each width of said data signal recording heads, and
   wherein positions at both sides of said reproducing head group in a lateral direction parallel to the width of said magnetic tape are set outside both sides of said recording head group in the lateral direction of a magnetic tape so as to include a control amount error in moving said head unit in the lateral direction of the magnetic tape,
   whereby a plurality of adjacent data tracks are simultaneously reproduced with said plurality of the data signal reproducing heads,
   wherein a number of data signal reproducing heads comprised in said reproducing head group is set more than a number, Nw×(Pw/Pr)+1, where Nw is a number of data signal recording heads comprised in said recording head group, Pw is a pitch of adjacent data signal recording heads within said recording head group, and Pr is a pitch of adjacent data signal reproducing heads within said reproducing head group.

2. A magnetic tape drive according to claim 1, wherein a head width of said data signal reproducing heads is set not less than Pw×0.2, where Pw is a pitch of adjacent data signal recording heads within said recording head group.

3. A magnetic tape drive according to claim 1, wherein a head width of said data signal recording heads is set not less than $2Wr+Dr$, where Wr is a head width of adjacent data signal reproducing heads within said reproducing head group and Dr is a distance between the adjacent data signal reproducing heads.

4. A magnetic tape drive according to claim 1, wherein said recording head group and said reproducing head group are arranged in three lines in a travel direction of said magnetic tape in order of said recording head group, said reproducing head group, and said recording head group.

5. A magnetic tape drive according to claim 1, wherein said recording head group and said reproducing head group are arranged in three lines in a travel direction of said magnetic tape in order of said reproducing head group, said recording head group, and said reproducing head group.

6. A magnetic tape drive according to claim 1, wherein said recording head group comprises eight data signal recording heads and said reproducing head group comprises 16 data signal reproducing heads.

\* \* \* \* \*